US012151489B2

(12) United States Patent
Praharaj et al.

(10) Patent No.: US 12,151,489 B2
(45) Date of Patent: Nov. 26, 2024

(54) SYSTEM AND METHOD FOR COOLING PAPER WITHIN A PRINTER ASSEMBLY

(71) Applicant: Xerox Corporation, Norwalk, CT (US)

(72) Inventors: Seemit Praharaj, Webster, NY (US); Jason Lefevre, Penfield, NY (US); Douglas K. Herrmann, Webster, NY (US); Jorge A. Alvarez, Webster, NY (US); Chu-Heng Liu, Penfield, NY (US); Yumeng Wu, West Lafayette, IN (US)

(73) Assignee: XEROX CORPORATION, Norwalk, CT (US)

( * ) Notice: Subject to any disclaimer, the term of this patent is extended or adjusted under 35 U.S.C. 154(b) by 130 days.

(21) Appl. No.: 17/816,488

(22) Filed: Aug. 1, 2022

(65) Prior Publication Data

US 2024/0034079 A1 Feb. 1, 2024

(51) Int. Cl.

| | |
|---|---|
| *B41J 29/377* | (2006.01) |
| *B41J 3/60* | (2006.01) |
| *B41J 11/00* | (2006.01) |
| *B41J 11/42* | (2006.01) |

(52) U.S. Cl.

CPC ............... *B41J 29/377* (2013.01); *B41J 3/60* (2013.01); *B41J 11/0015* (2013.01); *B41J 11/42* (2013.01)

(58) Field of Classification Search

CPC ........ B41J 29/377; B41J 3/60; B41J 11/0015; B41J 11/42

See application file for complete search history.

(56) References Cited

U.S. PATENT DOCUMENTS

| | | | | |
|---|---|---|---|---|
| 2014/0116275 A1* | 5/2014 | Walker | B41J 15/04 101/424.1 |
| 2022/0379648 A1* | 12/2022 | Mitsuyasu | B41J 15/04 |

* cited by examiner

*Primary Examiner* — Justin Seo

(74) *Attorney, Agent, or Firm* — Simpson & Simpson, PLLC

(57) ABSTRACT

Disclosed is a system and method for cooling paper within a printer assembly that includes at least one misting assembly designed to mist an aqueous solution onto an unprinted surface of paper stock after a first side is printed. At least one convection accelerator assembly is designed to accelerate evaporation of the aqueous solution before the printed paper stock arrives at the at least one printing station for printing on the unprinted surface. At least one or more of a paper temperature, machine temperature, printhead temperature, and humidity sensor are operationally coupled to at least one controller assembly programmed to control at least one or more of misting, humidity, and airflow. The at least one controller assembly is designed to determine the heat to be dissipated into the airflow from the printed paper stock to obtain a targeted paper temperature and, therefore, the amount and placement of aqueous solution misted.

10 Claims, 17 Drawing Sheets

Constants: 58kHz speed, 11x17, 300gsm cover-stock, Duplex, Dryers 100/130

| | IOT & Cooler Module conditions | Head Temp Setpoint | Run length (sheets) | Run time |
|---|---|---|---|---|
| 1 | Baseline machine - All covers ON/closed | 37°C | 4200 | 1hr.15min. |
| 2 | 1 A/C unit on IOT - All covers ON/closed | 37°C | 6000 | 1hr.30min. |
| 3 | 2 A/C units on IOT - All covers ON/closed | 37°C | 6000 | 1hr.30min. |
| 4 | 2 A/C units on IOT - All covers ON/closed | 35°C | 3000 | ~50min. |
| 5 | 2 A/C units on IOT - All covers ON/closed | 32°C | 650 | ~15min. |
| 6 | IOT Covers ON/closed; A/C units on both Cooler drums | 37°C | 4800 | 1hr.15min. |
| 7 | IOT Covers Open w/Fan; A/C units on both Cooler drums | 37°C | 6000 | 1hr.40min. |
| 8 | IOT Covers Open w/Fan; A/C units on both Cooler drums | 35°C | 4700 | 1hr.20min. |
| | | | | |

FIG. 3A

Constants: 58kHz speed, 11x17, 300gsm cover-stock, Duplex, Dryers 100/130

| | Steady State? | Cavity Temp | Peak Duplex Paper temp @ "iron-on" roller | Faults? | | |
|---|---|---|---|---|---|---|
| 1 | Yes | 27.8°C | 46.5°C | No | | |
| 2 | Yes | 24.4°C | 46°C | No | | |
| 3 | Yes | 22.8°C | 45°C | No | | |
| 4 | Very close | 22.2°C | 45°C | Yes - run end b/c head overtemp faults | | |
| 5 | No | 21.1°C | 43°C | Yes - run end b/c head overtemp faults | | |
| 6 | Yes | 27.8°C | 43.5°C | Yes - run end b/c head overtemp faults | | |
| 7 | Close - many jams | 23.3°C | 42.5°C | No | | |
| 8 | Yes | 23.2°C | 43°C | Yes - run end b/c head overtemp faults | | |
| | | | | | | |

FIG. 3B

Low Area Coverage:

| Low AC%, 20Kp run: Target 5MJ's/Kp/head or less | | | | |
|---|---|---|---|---|
| "Chip-out" run: | Average: MJ's/Kp/head | | | |
| | Black | Cyan | Magenta | Yellow |
| 40kHz, f02, DblSnz, 37°C | 150.0 | 280.0 | 150.0 | 175.0 |
| 40kHz, t3-6, DblSnz, 37°C | 3.0 | 9.0 | 9.0 | 40.0 |
| 40kHz, t3-6, DblSnz, 32°C | 2.0 | 5.0 | 1.0 | 12.0 |
| 58kHz, f02, DblSnz, 37°C | 0.5 | 0.4 | 0.3 | 0.4 |
| 58kHz, t3-6, DblSnz, 37°C | 0.6 | 0.0 | 2.0 | 0.0 |
| 58kHz, t3-6, DblSnz, 32°C | 0.9 | 0.2 | 0.2 | 0.2 |

FIG. 12

SYSTEM AND METHOD FOR COOLING PAPER WITHIN A PRINTER ASSEMBLY

FIELD OF THE INVENTION

The inventive concept relates generally to a system and method of cooling paper within a printer assembly.

BACKGROUND

Inkjet printing generates heat transferred to printed paper stock. Further, inkjet prinking on heavy, gloss paper stock generates more heat than printing on lighter, matte paper stock. If, during duplex printing, the paper stock of any type retains too much heat when it returns through a printing system to be printed on its second side, the residual heat in the paper stock can contribute to overheating printheads. One solution is to use ink formulated to, at a lower temperature, print with graininess superiority comparable to ink printed at a higher temperature. Because printheads typically have no mechanism for active cooling, however, printheads operating at lower temperatures are more prone to overheating during duplex printing from the contribution of heat retained by paper stock when the first side is printed. The thermal energy collected in multiple sheets of paper stock may be transferred to printheads when the second side of the paper stock is printed and cause untenable increases in printhead temperature. There is a need in the market, therefore, to reduce sheet temperature output beyond the reduction available from printer coolers so, during duplex printing, the residual heat from paper stock is low enough to avoid causing overheating of those printheads when printing paper stock on its second side.

SUMMARY OF THE INVENTION

Disclosed is a system and method for cooling paper within a printer assembly, the system and method including an interval on a duplex loop of a printing pathway where moisture is applied and then released from an unprinted side of printed paper stock. The system includes at least one misting assembly designed to mist an aqueous solution portion on a planar, unprinted surface of printed paper stock. The printed paper stock is dispensed in series from an at least one printing station, after printing on a first surface of the paper stock, through at least one dryer module, through at least one cooling module, before being disposed on a return pathway of a duplex loop for duplex printing at the at least one printing station. Therefore, a first side of the paper stock is printed, the unprinted side is misted, and then the unprinted side is printed.

The aqueous solution is delivered to the misting assembly from at least one or more of a container system and a pipe system. An at least one convection accelerator assembly is designed to accelerate evaporation of the aqueous solution misted onto the unprinted surface of the printed paper stock, the evaporation cooling the paper stock, before the printed paper stock arrives at the at least one printing station from the return pathway of the duplex loop for duplex printing. At least one or more of a paper temperature sensor, a machine temperature sensor, a printhead temperature sensor, and a humidity sensor are operationally coupled to at least one controller assembly.

The at least one controller assembly is programmed to control at least one or more of misting, humidity, and airflow, the airflow moved through at least one air inlet and to the at least one convection accelerator assembly by air pressure differentials within the printer assembly. Included is at least one controller assembly designed to determine the amount of heat to be dissipated into the airflow from the printed paper stock to obtain a selected sheet temperature of the printed paper stock. The at least one controller assembly further determines the amount and placement of aqueous solution to be misted onto the printed paper stock to dissipate the determined amount of heat.

In embodiments of the system for cooling paper within a printer assembly, the misting assembly may include at least one micro-dispenser valve assembly. Embodiments of the system for cooling paper within a printer assembly may be further designed to cool the printed paper stock to at or below the optimal printhead operating temperature. Some embodiments of the system for cooling paper within a printer assembly may further be designed to cool the printed paper stock to at or below 32° C.

In some embodiments of the system for cooling paper within a printer assembly, the at least one controller assembly may further control the humidity within the printer assembly through the aqueous solution evaporating from the paper stock. In some embodiments of the system for cooling paper within a printer assembly, the at least one controller assembly may control at least one fan assembly, the fan assembly designed to produce airflow for the convection accelerator assembly. In some embodiments of the system for cooling paper within a printer assembly, the system may be further designed to cool the printed paper stock to at or below the optimal printhead operating temperature within four seconds. In some embodiments of the system for cooling paper within a printer assembly, the length of time the printed paper stock resides on the return pathway of the duplex loop may be variable.

In one representative embodiment of the system for cooling paper within a printer assembly, at least one misting assembly is designed to mist the aqueous solution portion on the planar, unprinted surface of the printed paper stock, the printed paper stock dispensed in series from the printing station, through two dryer modules, through a cooling module, the cooling module having two cooling drums, and disposed on a pathway for duplex printing at the printing station. In this embodiment, the printer assembly includes at least one convection accelerator assembly designed to accelerate evaporation of the aqueous solution misted onto the unprinted surface of the printed paper stock before the printed paper stock arrives at the at least one printing station from the return pathway of the duplex loop for duplex printing, the misting assembly and the convection accelerator assembly disposed substantially on a lower portion of the drying and cooling modules.

In this representative embodiment, the at least one or more of the paper temperature sensor, the machine temperature sensor, the printhead temperature sensor, and the humidity sensor are operationally coupled to the at least one controller assembly, the at least one paper temperature sensor designed to measure the temperature of paper stock passed through the two cooling drums, the at least one controller assembly programmed to control at least one or more of the misting, humidity, and airflow, the airflow moved through at least one air inlet to the convection accelerator assembly by air pressure differentials within the printer assembly. The at least one controller assembly is designed to determine the amount of heat to be dissipated into the airflow from the printed paper stock to obtain a sheet temperature of the printed paper stock at or below 32° C., the at least one controller assembly further determining the amount and placement of the aqueous solution to be sprayed as a substantially conical mist by the at least one micro-dispenser valve assembly onto the printed paper stock to dissipate the determined amount of heat.

In this representative embodiment of the system for cooling paper within a printer assembly, the at least one controller assembly may further control the humidity within the printer assembly through moisture evaporated from the paper stock. In this representative embodiment of the system for cooling paper within a printer assembly, the at least one controller assembly may control at least one fan assembly, the fan assembly designed to produce airflow for the convection accelerator assembly. In this representative embodiment of the system for cooling paper within a printer assembly, the system is further designed to cool the printed paper stock to at or below 32° C. within four seconds.

The inventive concept, to include the system and its corresponding method, now will be described more fully hereinafter with reference to the accompanying drawings, which are intended to be read in conjunction with both this summary, the detailed description, and any preferred and/or particular embodiments specifically discussed or otherwise disclosed. Inventive concepts may, however, be embodied in many different forms and should not be construed as limited to the embodiments set forth herein; rather, these embodiments are provided by way of illustration only and so that this disclosure will be thorough, complete, and will fully convey the full scope of the inventive concepts to those skilled in the art.

BRIEF DESCRIPTION OF THE DRAWINGS

FIGS. 3A-3B illustrate one representative experiment of printhead temperature operations.

FIG. 12 illustrates how the temperature of the printheads are more easily overheated in duplex heavy-stock paper stock applications.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1A:
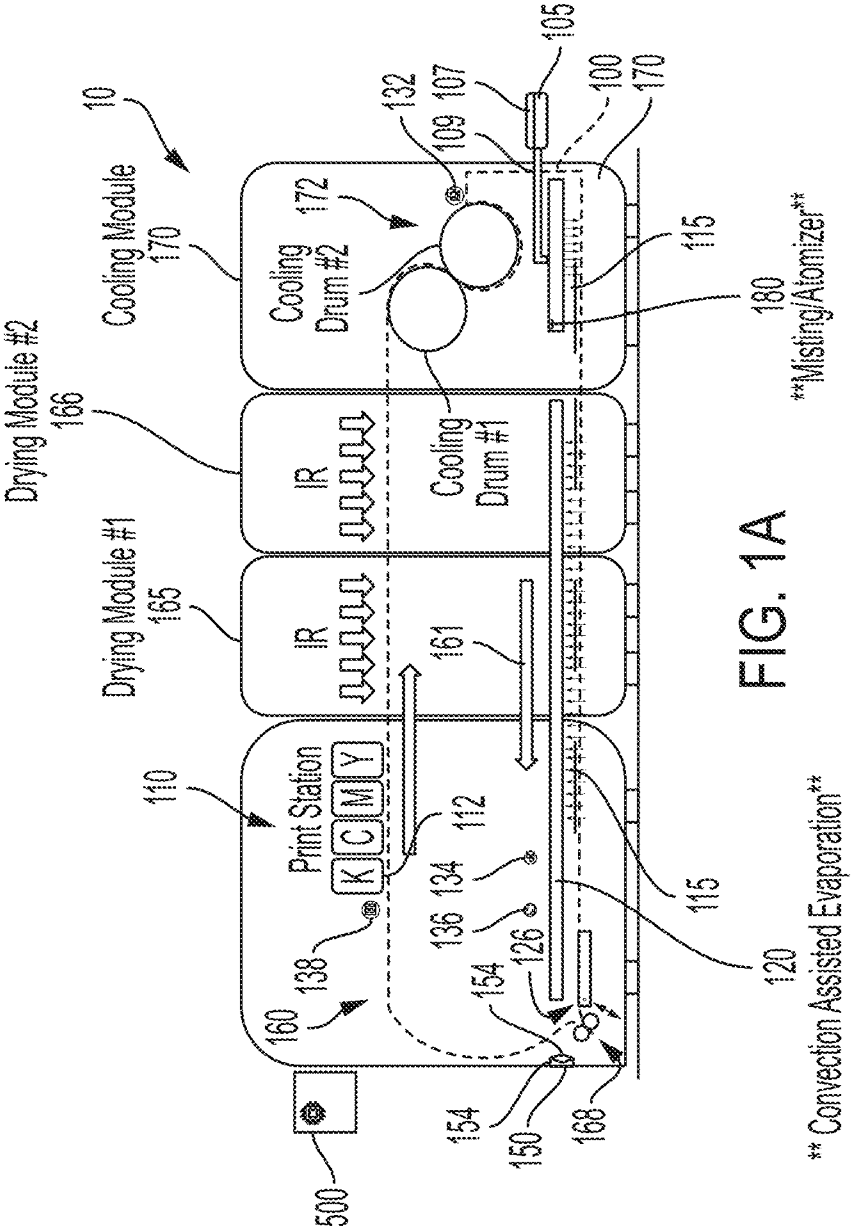
FIG. 1A-1B illustrates a representative cutaway view of the system for cooling paper within a printer assembly.
Figure 1B:
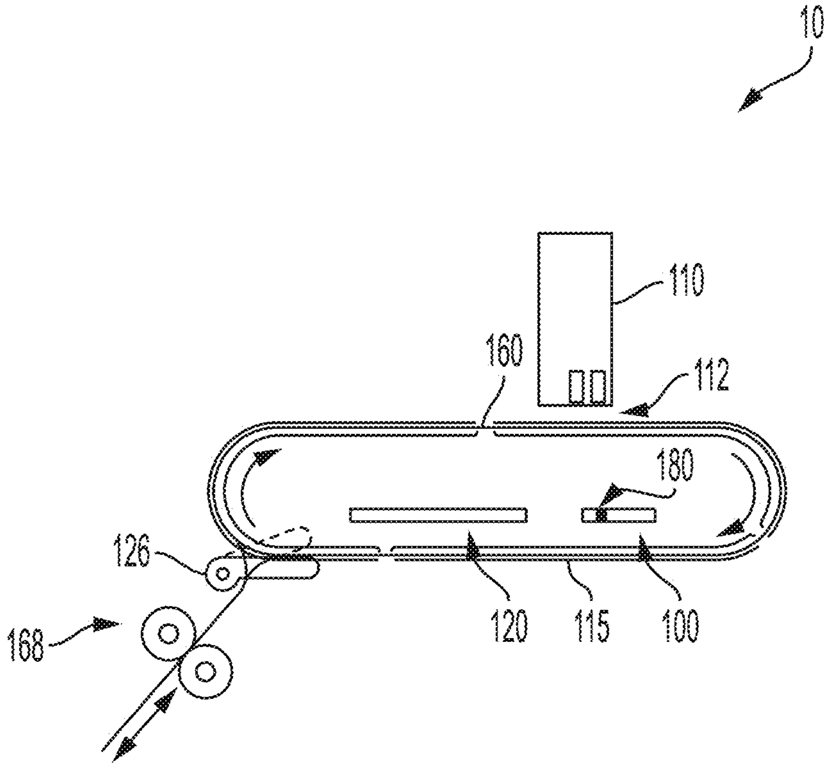

FIG. 1A-1B illustrate the disclosed inventive concept which includes a misting assembly 100 within a printer assembly 10, the misting assembly 100 which may be termed a mister or atomizer module and which is designed to apply an aqueous solution 105 to the non-printed side of at least one sheet of paper stock 115 after the paper stock 115 exits a drying module 165 and before duplex printing. Misting involves an aqueous solution 105 atomized in air or other gas wherein the mist as applied herein is directed at the unprinted side of the paper stock 115. Directed may be considered misting which may also be termed spraying wherein the atomized aqueous solution is applied specifically to the unprinted side of the paper stock 115. The aqueous solution 105 is applied, therefore, by the misting assembly 100 after printing on one side of the paper stock 115. The aqueous solution 105 is applied to the unprinted side of the paper stock 115. A module, as defined in this disclosure, can include a separatable unit but may also denote an operational section of a continuous unit. Evaporation of the applied aqueous solution 105 reduces the temperature of the paper stock 115 by way of the thermal principles of evaporative cooling, that liquid evaporating from a surface absorbs heat and, correspondingly, reduces the temperature on that surface.

Evaporation as disclosed is a type of vaporizing that happens on the surface of a liquid as it changes to a gas phase. When a molecule near the surface absorbs enough thermal energy to overcome the vapor pressure, it will escape and enter the surrounding air as a gas. The thermal energy removed from the vaporized liquid will reduce the temperature of the liquid, resulting in evaporative cooling. Thermal energy refers to the energy contained within a system that is responsible for its temperature. Heat is the flow of thermal energy. Thermal energy effects the inventive concept in terms of heat and associated temperature. To create evaporative cooling, the aqueous solution 105 is delivered to the misting assembly 100 from at least one or more of a container system 107 and a pipe system 109. Heat is dissipated into the surrounding air, dissipate meaning in this disclosure to disperse and, ultimately, substantially disappear from the system for cooling paper.

Figure 2:
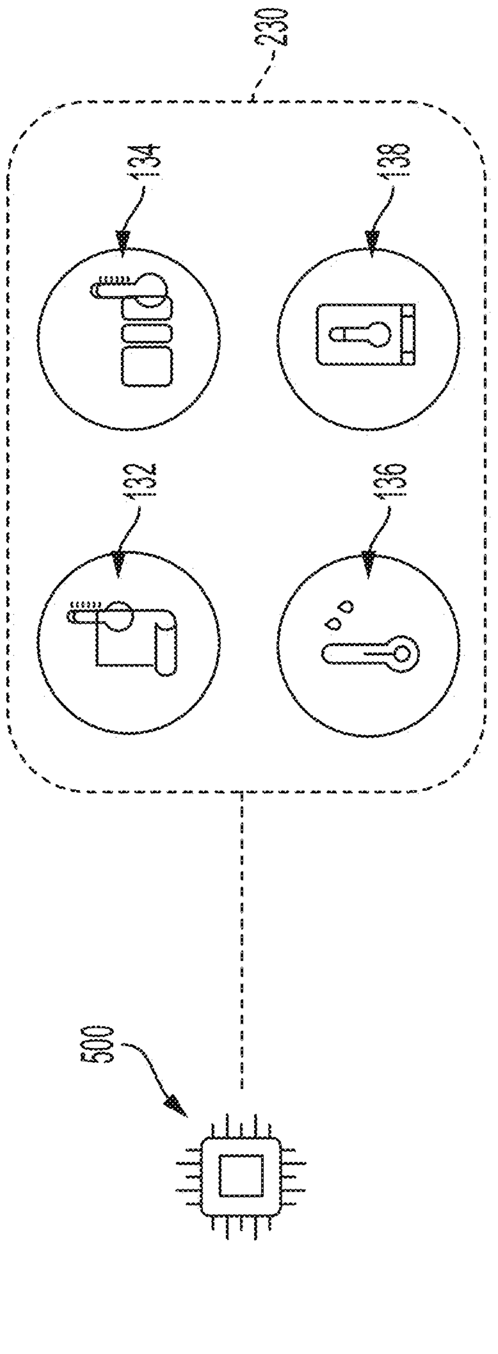
FIG. 2 illustrates a representative sensor assembly.
Figure 5:
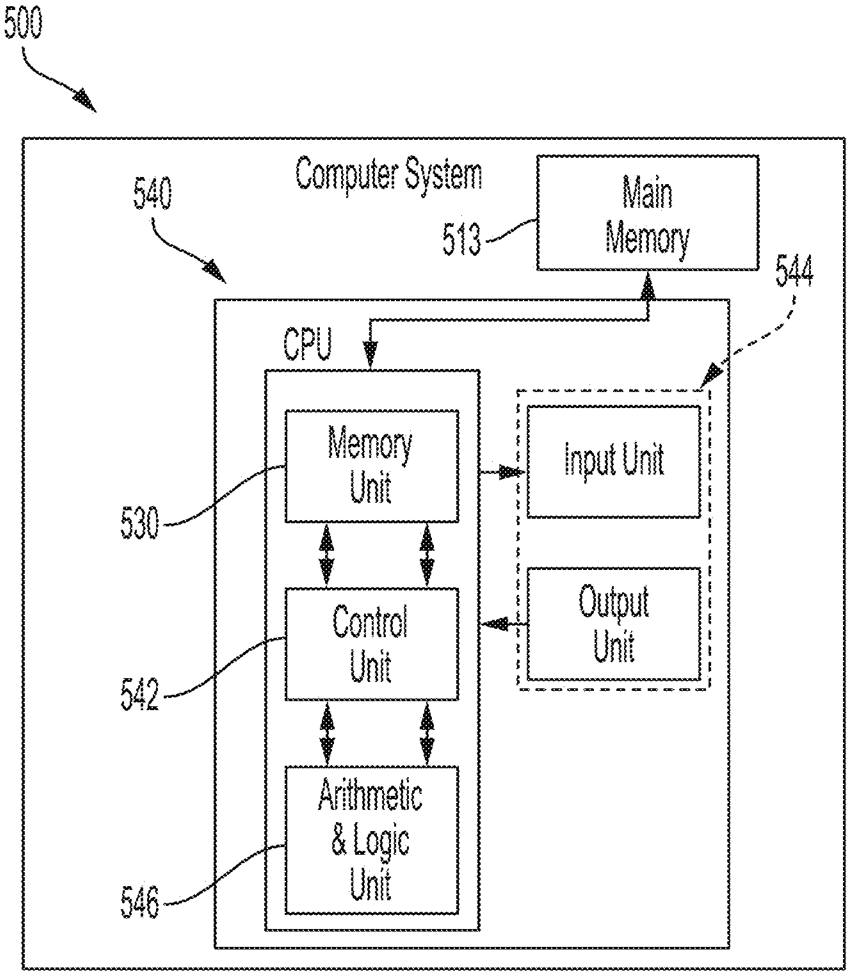
FIG. 5 illustrates a central processing unit (CPU), also called a central processor or main processor, that is the electronic circuitry within a representative controller assembly.

FIGS. 1A-1B and FIG. 2 illustrate that a sensor assembly 230 is operably connected to at least one controller assembly 500, the controller assembly illustrated in FIG. 5, the at least one controller assembly 500 designed to use data from the sensor assembly 230 to determine the amount of the aqueous solution 105 to apply to each sheet of paper stock 115 based on the present temperature of the paper stock 115, the ambient conditions, and the target temperature of the paper stock 115.

FIG. 1A-1B further illustrate a convection accelerator assembly 120 designed to accelerate convection along a return path 161 of a duplex loop 160 and moving toward at least one printing station 110 and markers or printheads 112 therein. The sensor assembly 130 includes at least one or more of a paper temperature sensor 132, a machine temperature sensor 134, a humidity sensor 136, and a printhead temperature sensor 138, through which the at least one controller assembly 500 controls both the amount of the aqueous solution 105 applied to the paper stock 115 and airflow that accelerates convection in the convection accelerator assembly 120, air flowing through at least one air inlet 150 and to the at least one convection accelerator assembly 120 by air pressure differentials within the printer assembly 10. The air pressure differentials may be delivered by at least one or more of bladed and bladeless fan assemblies, the representative embodiment illustrating a bladed fan assembly 152, and may further include at least one air filter assembly 154.

FIG. 1A-1B further illustrates that in one representative embodiment of the inventive concept, each sheet of paper stock 115 proceeds through the printing station 110 where it is printed on one side. The paper stock 115 then is moved to at least one drying module 165 whereupon the paper stock 115 moves through a cooling module 170 that includes at least one cooling drum 172. In the representative embodiment, two cooling drums 172 are illustrated, and after the second cooling drum 172, the at least one paper temperature sensor 132 measures the temperature of the paper stock 115. One representative embodiment of the cooling module 170 appears in U.S. Pat. No. 9,176,469B2, though other embodiments may be used.

FIG. 1A-1B further illustrate that the paper stock 115 then moves through the misting assembly 100 whereupon the aqueous solution 105 is deposited on the unprinted side of paper stock 115 as a multiplicity of microdroplets, the at least one controller assembly 500 determining both amount, smoothness, and gradient of microdroplet deposits as required, the at least one controller assembly 500 further taking into account in its calculations the ambient machine temperature recorded from the at least one machine temperature sensor 134, the humidity from the at least one humidity sensor 136, as well as, but not limited to, such variables as the temperature of the printhead 112, the type of paper stock 115, the target temperature of the paper stock 115, the airflow, and the time available for the paper stock 115 to cool. The at least one controller assembly 500 determines the amount of heat that needs to be removed through evaporative cooling of the applied aqueous solution 105 to reach the targeted temperature of the paper stock 115.

The illustrated embodiment in FIG. 1A-1B uses at least one micro-dispenser valve 180 for controlling the volume of the aqueous solution 105 wherein the at least one micro-dispenser valve 180 uses pulse-width modulation to produce an about 50-degree solid cone spray pattern. Other embodiments may use other micro-dispense valves 180 and may produce other patterns of dispensing from which the at least one controller assembly 500 can control the amount and placement of the aqueous solution 105. Independent control of the liquid and air pressure in a micro-dispense valve nozzle 181 of the micro-dispense valve 180 allows for precise flow rate regulation. Other embodiments include, but are not limited to, flood coat with an anilox roller and electrostatic precipitation.

The disclosed inventive concept prioritizes on the amount of aqueous solution 105 deposited on the paper stock 115 with placement of aqueous solution 105 designed to facilitate evaporative cooling. Some embodiments may, as a secondary function, allow the at least one controller assembly 500 to obtain the desired placement for facilitating evaporative cooling while also selecting placement of aqueous solution 105 to minimize curling of paper stock 115.

FIG. 1A-1B further illustrate that the paper stock 115 then moves to the convection accelerator assembly 120 where forced convection may be used to accelerate evaporation of the aqueous solution 105 as required before the paper stock 115 returns to the printing station 110 for duplex printing. The convection accelerator assembly 120 uses airflow to accelerate evaporation and heat dissipated into the airflow by evaporation of the aqueous solution 105 from the unprinted side of the paper stock 115. Convection is accelerated or forced by successively replacing air that has received some heat and moisture through evaporation of the aqueous solution 105 from the paper stock 115 with air that has receive less heat and moisture through evaporation of the aqueous solution 105 from the paper stock 115 given that the replacing air can accept more heat and moisture faster than the air it replaces. In some embodiments, the time that given paper stock 115 is disposed within the convection accelerator 120 may vary and may be controlled. The misting assembly 100 and the convection accelerator assembly 120 are disposed substantially on a lower portion of the at least one drying module 166 and cooling module 171 and along the duplex loop 160. The paper stock 115 then moves to a paper stock inverter 168 operatively arranged along the duplex loop 160.

FIGS. 1A-1B illustrate one representative embodiment of the paper stock inverter 168, as also illustrated in U.S. Pat. No. 11,347,459, wherein the paper stock inverter 168 is part of the duplex loop 160. Starting with the duplex loop 160, in this representative embodiment, the duplex loop 160 generally comprises an endless belt which is capable, by means of friction, static electricity, vacuum, or other means, of retaining a plurality of sheets (e.g., paper stock 115) thereon, thereby retaining a particular sheet until it is time for the sheet to receive an image on the side of the sheet facing outwardly from the belt of the duplex loop 160. In the embodiment shown, the duplex loop 160 further takes paper stock 115 through the misting assembly 100 and the convection accelerator assembly 120 disclosed herein. It is intended that sheets of paper stock 115 "ride" on the outer surface of the belt of the duplex loop 160. Along one portion of duplex loop 160, the belt of the duplex loop 160 comes into contact close enough for at least one printhead 112 to—and which the at least one printhead may—transfer an image onto the side of the sheet facing outwardly from the belt of duplex loop 160. In some embodiments, the printhead 112 comprises one or more ink jet printheads.

FIGS. 1A-1B further illustrate the representative example of the paper stock inverter 168. To create a duplex print, that is, a print having one desired image on one side of a sheet of paper stock 115 thereof and another desired image on the other side thereof, it is necessary to make the other side of the sheet available to the one or more printheads 112 at the printing station 110 by causing the unprinted side of the sheet to face outward while the sheet rides on the outside of duplex loop 160. For this purpose, the paper stock inverter 168 is operatively arranged along duplex loop 160. Inverter 168 is operatively arranged to remove a sheet from duplex loop 160 which comprises an image already arranged on the outward-facing side thereof, and turn the sheet over so that the other, "non-printed" side of the sheet faces outward from the belt of duplex loop 160. Thus, inverter 168 removes the sheet from duplex loop 160, feeding it in one direction, and then delivering the sheet back to duplex loop 160 (as shown by the double-headed arrow next to inverter 168) to turn the sheet over (i.e., rotate the sheet 180°). Duplex loop 160 then re-feeds the sheet for another cycle so that printhead 112 can place another desired image on the other side thereof. In this representative embodiment, gate 126 is operatively arranged to selectably cause the sheet to enter inverter 168, depending on whether the particular sheet passing therepast is a simplex print, the first side of a duplex print, or a second side of a duplex print. The inventive concept is not limited to the representative paper stock inverter disclosed; other sheet inverter solutions may be used.

FIGS. 3A-3B illustrate one representative aspect of the inventive concept wherein an experiment is run to show that even when printheads 112 run at 37° C., commercially expected conditions of operation can lead to overheating if evaporative cooling, by way of the disclosed aqueous solution 105, is absent. Lowering temperatures of printheads 112, however, for example, to 32° C.—even if suitable inks are used to match the graininess superiority typically obtained from printing at higher temperatures, illustrated in FIG. 10—leaves those printheads 112 more easily overheated by residual heat in paper stock 115 than printheads operating at higher temperatures. That residual heat in the paper stock 115 comes from having the first side printed at the printing station 110. Residual heat may also be accumulated at other points in the printing assembly 10 such as the drying module 165.

Figure 4:
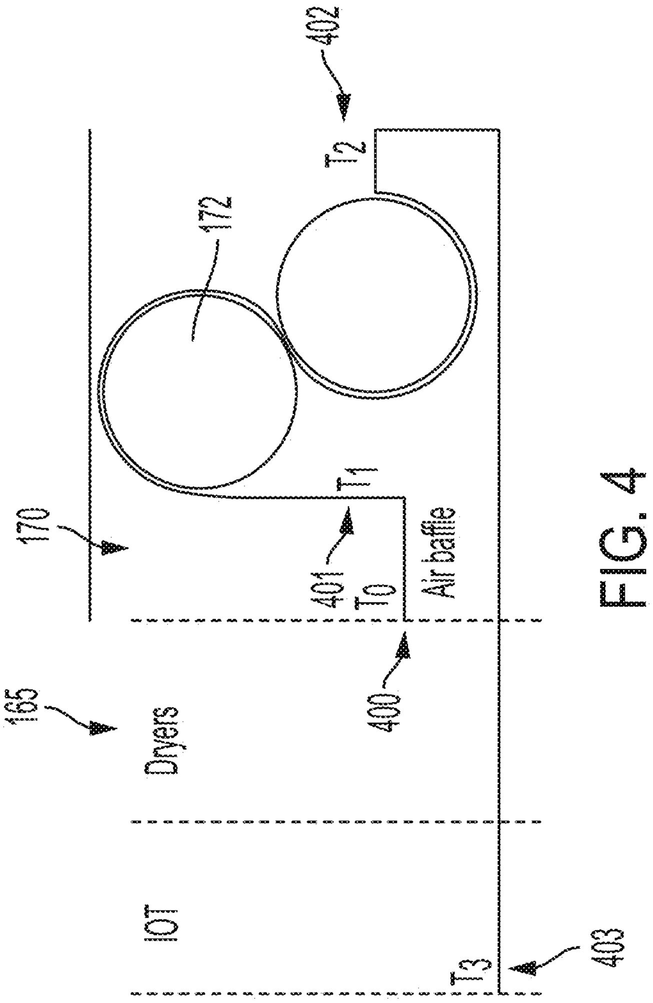
FIG. 4 illustrates points of temperature change for paper stock in accord with a representative calculation for one representative printer system.

FIG. 4 illustrates points of temperature change for paper stock 115 in accord with a representative calculation for one representative printer system with locations of temperature marked 401, 402, 403, and 404. Other systems and calculations apply to embodiments of the inventive concept associated with the disclosed variables and equations. Variables used in this model are defined in Table 1. In addition, RH represents the percentage relative humidity. This representative embodiment illustrates how evaporative cooling can cool representative paper stock 115 by 7.19° C. in 3.04 seconds. The inventive concept allows variables to change to produce different results.

TABLE 1

| Nomenclature | | |
|---|---|---|
| $c_p$: paper specific heat (J/gK) | $m_p$: paper mass (g) | $\Delta T_p$: paper temp change (K) |
| $g_s$: $H_2O$ evaporation rate (g/s) | v: air speed (m/s) | A: water surface area ($m^2$) |
| $H_{vap}$: water evaporation heat (J/g) | $m_w$: water mass | $x_s$: saturated vapor percentage (g $H_2O$/g air) |

The representative model in this representative embodiment is based on the laws of energy conservation from thermodynamics where energy to evaporate water—water being the representative aqueous solution 105 in the illustrated example—comes entirely from energy loss from the sheet of paper stock 115. Fine-tuning of the representative model in other embodiments may account for heat from other sources.

Heat dissipated from paper stock 115 is $c_p m_p \Delta T_p$.

Evaporation energy of the water is $H_{vap} m_w$.

The water evaporation rate $g_s=((25+19\ v)\ Ax_s\ (1-RH))/3.6$.

The amount of water evaporated is the product of $g_s$ and the time t, which is $d/v_p$, where d is the distance and $v_p$ is the travel speed of the paper stock 115, for example, 13*19 in paper stock 115 at 270 gsm [grams per square meter] with forced convection at 1 m/s at 30° C. with 40% relative humidity.

$$m_p=13*19*0.000645*270=43\text{ g.}$$

$$c_p=4000\text{ J/gK.}$$

$$g_s=((25+19*1)*0.159*0.02715*(1-0.4))/3.6=0.0317\text{ g/s.}$$

$$t=3.7338/1.227=3.04\text{ sec.}$$

$$H_{vap}=2429.8\text{ J/g.}$$

$$\Delta Tp=(2429.8*0.0317*3.04)/(4000*43)=7.19°\text{ C.}$$

In the representative calculation, paper stock 115 is cooled 7.19° C. in 3.04 seconds, a temperature differential suitable, in representative embodiments, to bring the temperature of given sheets of the paper stock 115 to below 32° C. The at least one controller assembly 500 is designed to use the representative calculation or other such calculations that apply laws of thermodynamics from which to bring the temperature of given sheets of paper stock 115 to or below the target temperature required for continuous operation of the printheads 112 without the energy from the paper stock 115 contributing substantially to overheating of the printheads 112 during duplex printing. In other embodiments, the at least one controller assembly 500 may further control humidity generated by the misting assembly 100 to improve the reliability of the printhead assembly 112. The at least one controller assembly 500, in these embodiments, may allow a humidity level sub-optimal for evaporating the aqueous solution 105 but good enough to allow the evaporation rate required, the humidity, therefore, optimized for operating the printhead assembly 112 where optimal is defined as substantially the best value of the given variable for reaching the targeted temperature of paper stock 115 considering other values in the disclosed system. In such embodiments, for example, the rate of forced convection may be increased to compensate for the sub-optimal humidity for evaporating the aqueous solution 105 at the required rate. As used herein, terms such as ‘optimal’ shall be construed broadly, to relate to this particular practical situation, and shall not be construed to require a mathematical or provable optimum.

The aqueous solution 105 may be substantially water but may include other chemicals such as alcohol. The representative embodiment uses an aqueous solution 105 that is substantially water.

With reference to FIG. 5, a central processing unit (CPU) 540, also called a central processor or main processor, is the electronic circuitry within the at least one controller assembly 500 that executes instructions that make up computer programs used by the inventive concept. The CPU 540 performs basic arithmetic, logic, controlling, and input/output (I/O) operations specified by the instructions in the program. An arithmetic & logic unit (ALU) 546 is a combination digital electronic circuit that performs arithmetic and bitwise operations in integer binary numbers. Traditionally, the term CPU 540 refers to a processor, more specifically to its processing unit and control unit (CU) 542, distinguishing these core elements of a computer from external components such as main memory 513 and input-output (I/O) circuitry 544. A CPU 540 may also contain memory 530. Memory 530 refers to a component that is used to store information for immediate use in a computer.

Figure 6:
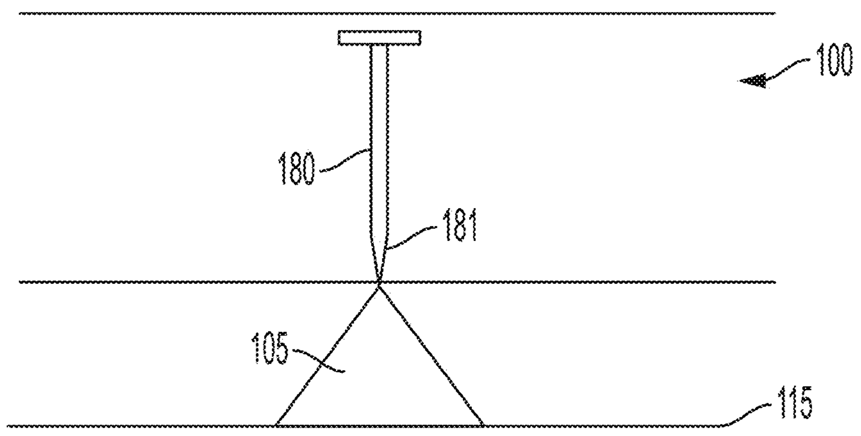
FIG. 6 illustrates a representative model of a micro-dispense valve.

FIG. 6 illustrates a representative model of the micro-dispense valve 180. The inventive concept can use a variety of micro-dispenser valve types and is not reliant upon one type.

Figure 7:
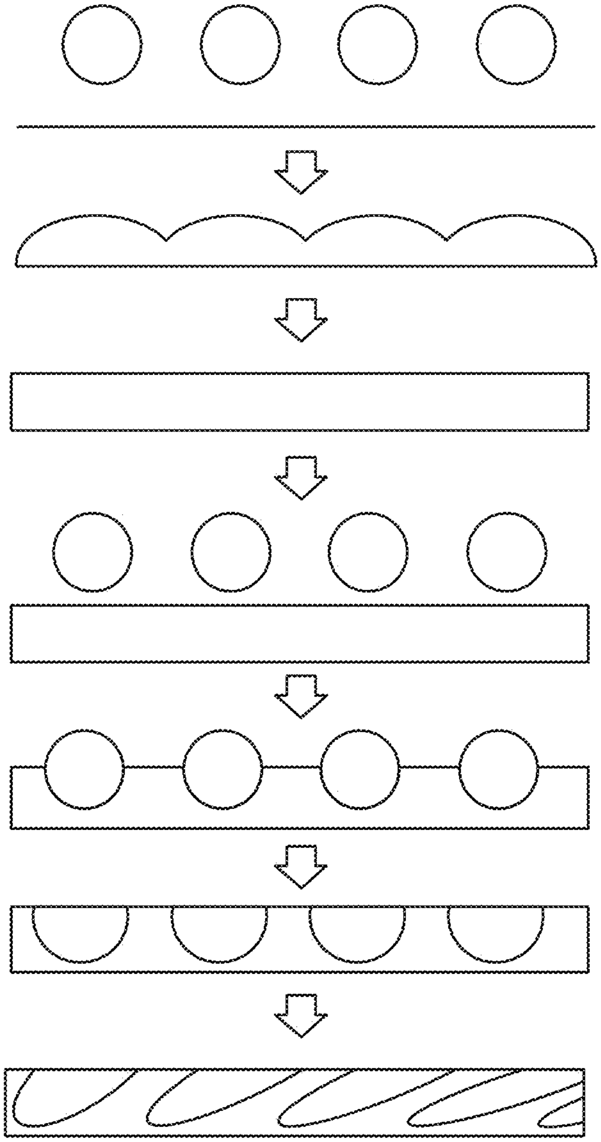
FIG. 7 illustrates a sequence of events leading to the appearance of graininess on prints.

FIG. 7 illustrates a sequence of events leading to the appearance of graininess on prints.

Figure 8:
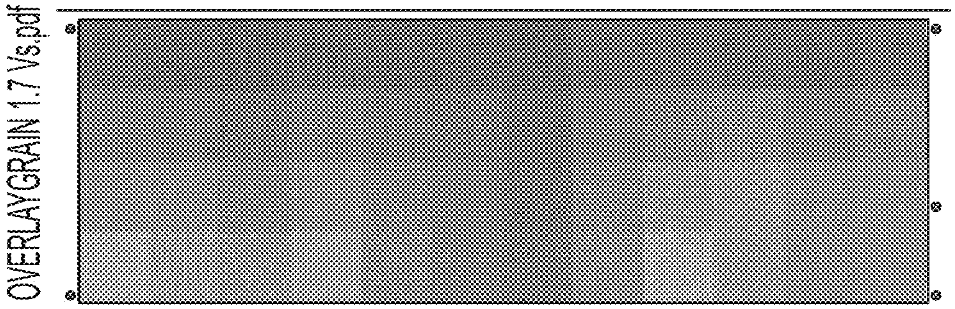
FIG. 8 illustrates a representative target that is employed as a quantitative measurement for overlay graininess.

FIG. 8 illustrates a representative target that is employed as a quantitative measurement for overlay graininess.

Figure 9:
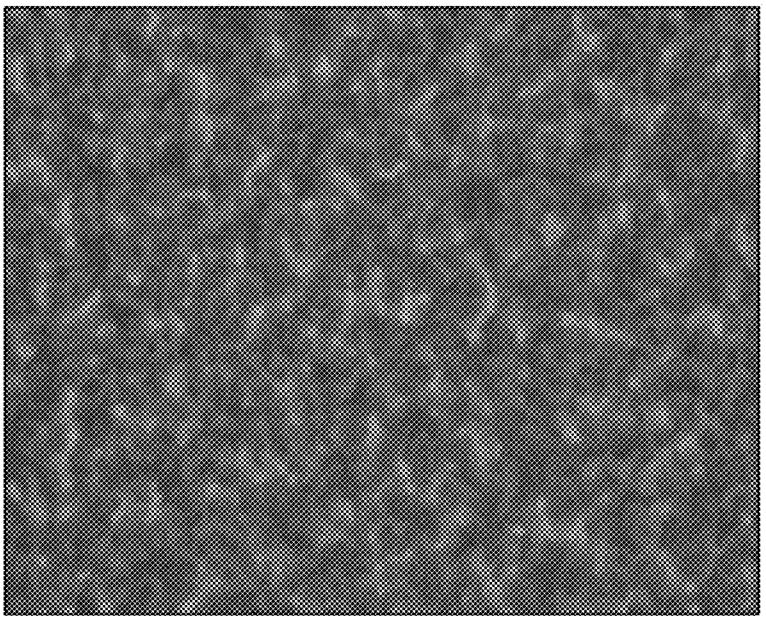
FIG. 9 represents a magnified view from a printed sample demonstrating image quality (IQ) defects.

FIG. 9 represents a magnified view from a printed sample demonstrating image quality (IQ) defects. FIG. 9 further illustrates a printed overlay graininess sample (HF Ink on McCoy Gloss). The representative overlay graininess target includes various combinations of CMYK ranging from 0-80% spread over 48 1"×1" squares. A high frequency graininess measurement (VNHF) is made from each of the squares and an RMS value is reported as the Overlay Graininess Score for the particular print. The inventive concept graininess values and targets are not limited to the values presented in this sample, the sample being for illustration.

Figure 10:
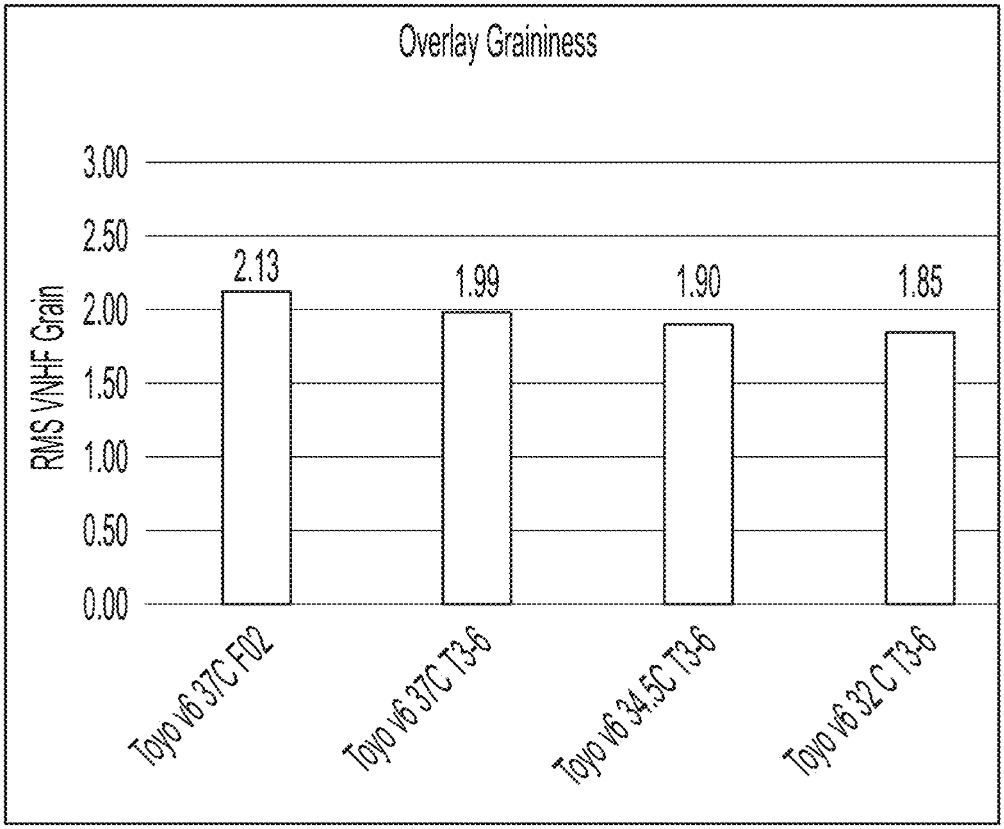
FIG. 10 illustrates through a graph a relationship between printhead temperature performance.

FIG. 10 illustrates through a graph a relationship between a 37° C. setpoint of a representative printhead 112 (Toyo v6 37 T3-6) and a 32° C. setpoint of a representative printhead 112 (Toyo v6 32 T3-6). Between these two representative data points of 1.99 and 1.85, there would seem to be a small difference. But in fact, a difference of 0.15 is notable in terms of the visual effect on paper stock 115.

Figure 11:
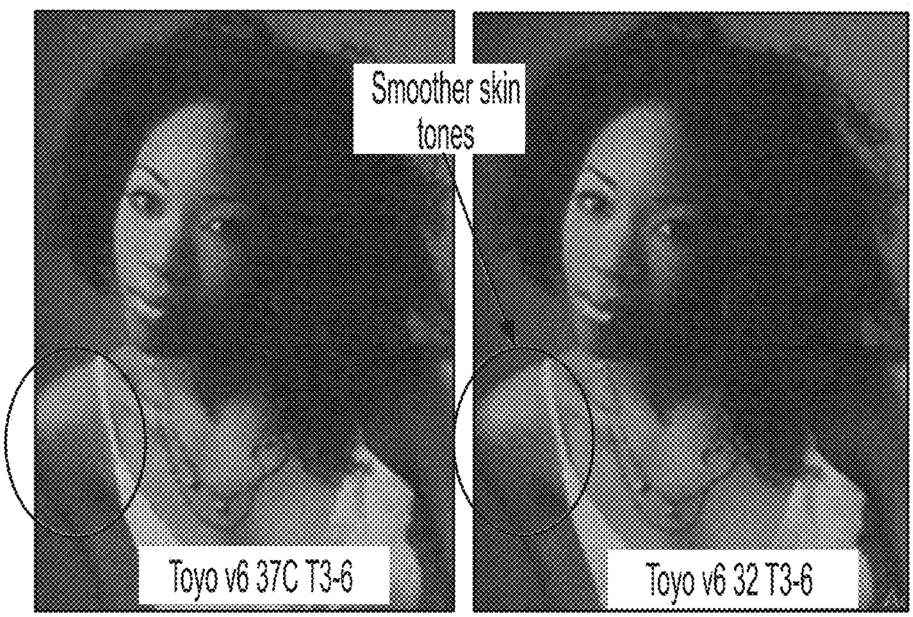
FIG. 11 illustrates a representative printed photograph pair to illustrate jetting at differing temperatures.

FIG. 11 illustrates, through a representative printed photograph pair, an added benefit the jetting stability of an improved ink that may be employed by the inventive concept which is made more robust when the printhead temperature is reduced to 32° C. In the plot illustrated is a summary of the accumulation rate for each color under a variety of printing conditions illustrating that the 32° C. performance is better than the corresponding run at 37° C., thereby supporting operation of the printheads 115 at 32° C. Improved inks may contribute to the usefulness of the inventive concept.

FIG. 12 illustrates how the temperature of printheads at 32° C. are more easily overheated in duplex heavy-stock paper stock applications. The disclosed inventive concept reflects the desire to have the ability to further reduce the sheet temperature so that the sheet temperature does not contribute substantially to overheating the printheads 112, even, as illustrated by one representative embodiment, if the head temperature setpoint is low (30-32° C. range). The same principle of using evaporative cooling to cool paper stock 115 may be used for targeted temperatures of printheads 112 of different temperature ranges. In some embodiments, some heat may still be transferred to printheads 112 from cooled paper stock 115, and substantially as used here means a level of heat transfer insufficient to cause overheating of the printheads 112.

Figure 13A:
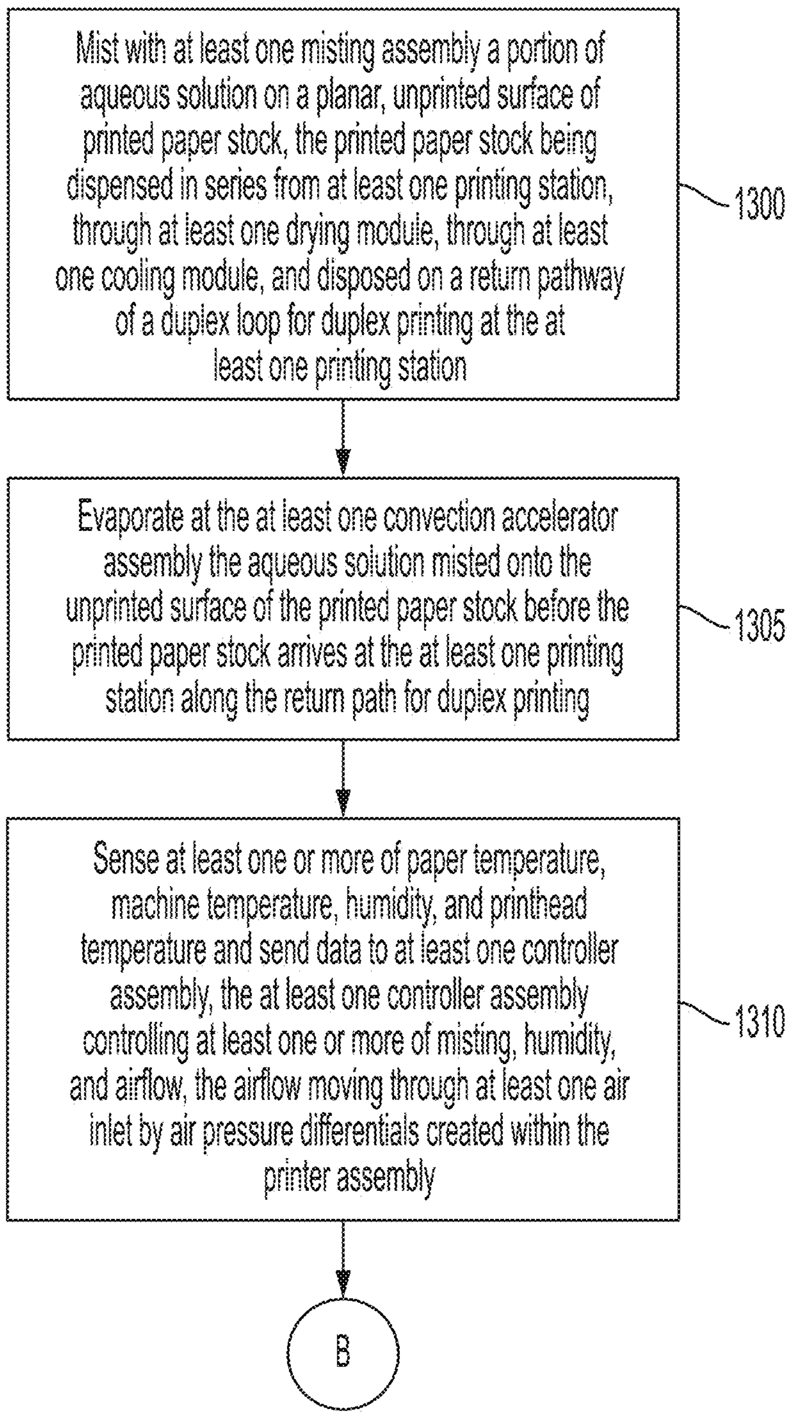
FIGS. 13A-13C illustrate a representative method for cooling paper within a printer assembly.
Figure 13B:
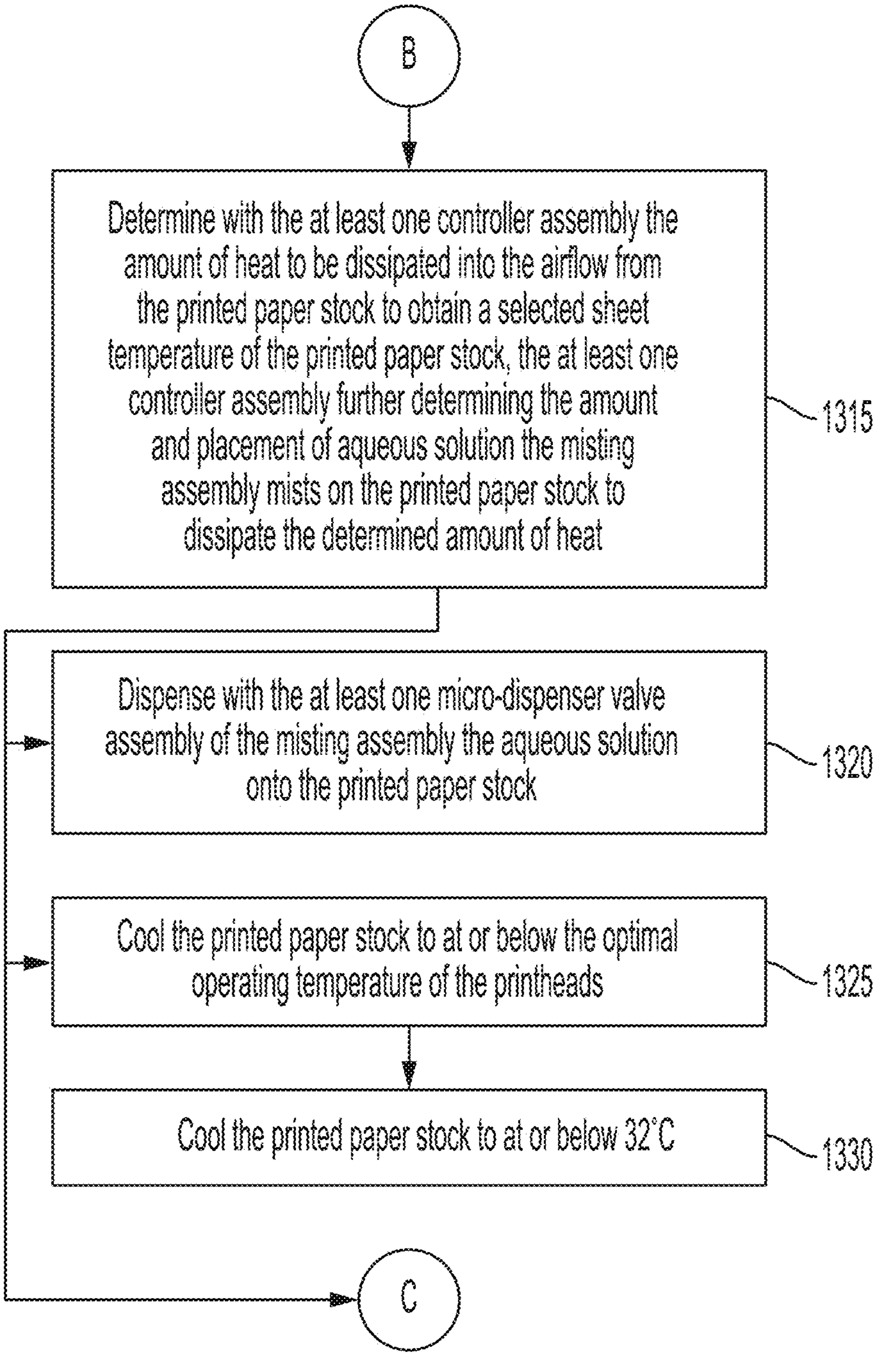
Figure 13C:
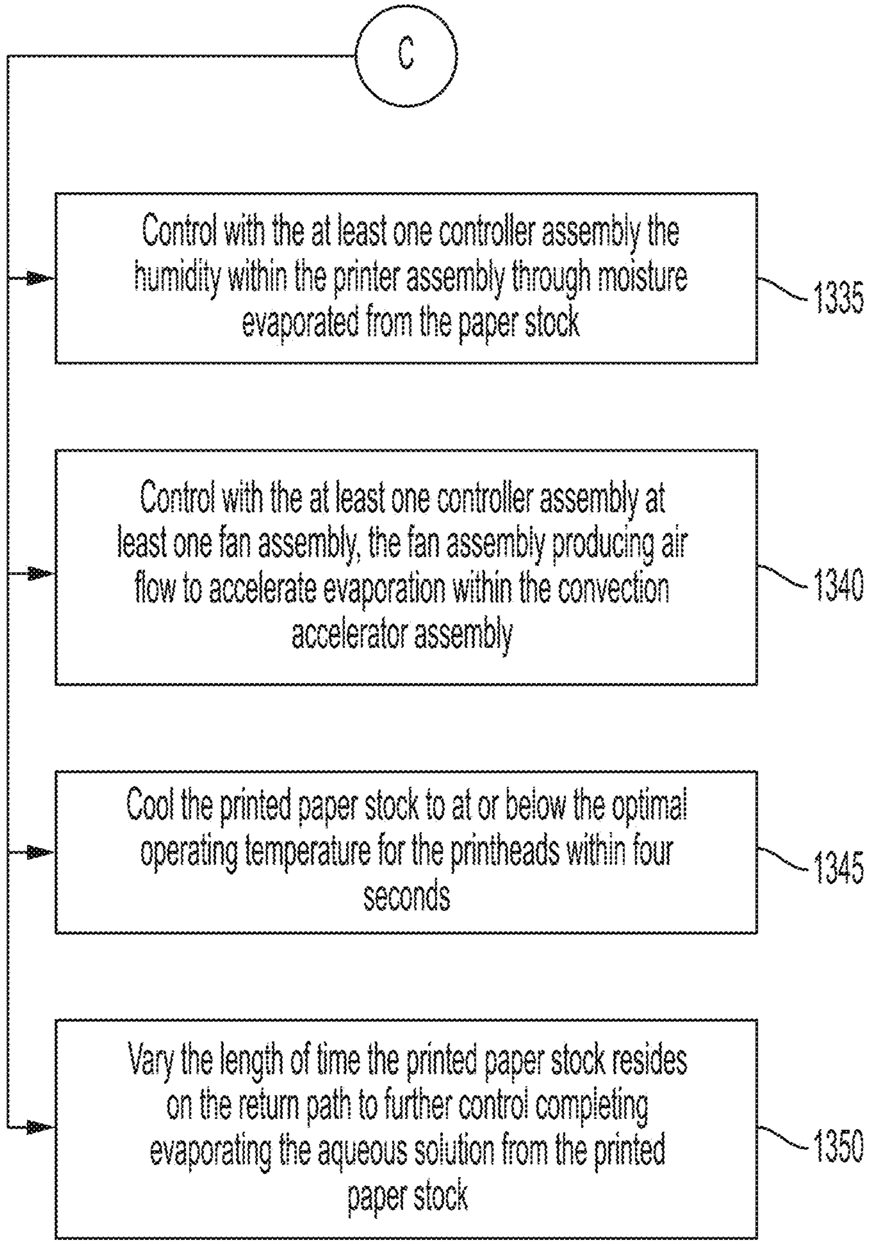

FIGS. 13A-C illustrate a disclosed method for cooling paper within the printer assembly 10. The method includes the step of 1300, misting with the at least one misting assembly 100 the portion of aqueous solution 105 on the planar, unprinted surface of the printed paper stock 115, the printed paper stock 115 being dispensed in series from the at least one printing station 110, through the at least one drying module 165, through the at least one cooling module 170, and disposed on the return path 161 of the duplex loop 160 for duplex printing at the at least one printing station 110. The method further includes the step of 1305, evaporating at the at least one convection accelerator assembly 120 the aqueous solution 105 misted onto the unprinted surface of the printed paper stock 115 before the printed paper stock 115 arrives at the at least one printing station 110 from the return path 161 of the duplex loop 160 for duplex printing.

FIGS. 13A-C further illustrate that the method for cooling paper within the printer assembly 10 includes the step of 1310, sensing at least one or more of paper temperature, machine temperature, humidity, and printhead temperature and sending data to the at least one controller assembly 500, the at least one controller assembly 500 controlling at least one or more of misting, humidity, and airflow, the airflow moving through the at least one air inlet 150 by creating air pressure differentials within the printer assembly 10. The method further includes the step of 1315, determining with the at least one controller assembly 500 the amount of heat to be dissipated into the airflow from the printed paper stock 115 to obtain a selected sheet temperature of the printed paper stock 115, the at least one controller assembly 500 further determining the amount and placement of aqueous solution 105 the misting assembly 100 mists onto the printed paper stock 115 to dissipate the determined amount of heat.

FIGS. 13A-C further illustrate that the method for cooling paper within the printer assembly 10 may further include the step of 1320, dispensing with the at least one micro-dispenser valve assembly 180 of the misting assembly 100 the aqueous solution 105 onto the printed paper stock 115. The method may further include the step of 1325, cooling the printed paper stock 115 to at or below the optimal operating temperature of the printheads 112. The method may further include the step of 1330, cooling the printed paper stock 115 to at or below 32° C. The method may further include the step of 1335, controlling with the at least one controller assembly 500 the humidity within the printer assembly 10 through moisture evaporated from the paper stock 115.

FIGS. 13A-C further illustrate that the method may further include the step of 1340, controlling with the at least one controller assembly 500 the at least one fan assembly 152, the fan assembly 152 producing airflow accelerating evaporation within the convection accelerator assembly 120. The method may further include the step of 1345, cooling the printed paper stock 115 to at or below the optimal operating temperature for the printheads 112 within four seconds. The method may further include the step of 1350, varying the length of time the printed paper stock 115 resides on the return path 161 of the duplex loop 160 to further control completing evaporating the aqueous solution 105 from the printed paper stock 115.

While inventive concepts have been described above in terms of specific embodiments, it is to be understood that the inventive concepts are not limited to these disclosed embodiments. Upon reading the teachings of this disclosure, many modifications and other embodiments of the inventive concepts will come to mind of those skilled in the art to which these inventive concepts pertain, and which are intended to be and are covered by both this disclosure and the appended claims. It is indeed intended that the scope of the inventive concepts should be determined by proper interpretation and construction of the appended claims and their legal equivalents, as understood by those of skill in the art relying upon the disclosure in this specification and the attached drawings.

The invention claimed is:

1. A system for cooling paper within a printer assembly, the system comprising:

at least one misting assembly adapted to mist an aqueous solution portion on a planar, unprinted surface of printed paper stock;

at least one convection accelerator assembly adapted to accelerate evaporation of the aqueous solution misted onto the unprinted surface of the printed paper stock;

at least one controller assembly programmed to control misting and airflow, the airflow moved through the at least one convection accelerator assembly by air pressure differentials within the printer assembly;

the at least one controller assembly adapted to determine the amount of heat to be dissipated into the airflow from the printed paper stock to obtain a selected sheet temperature of the printed paper stock; and the at least one controller assembly further adapted to determine the amount and placement of aqueous solution to be misted onto the printed paper stock to dissipate the determined amount of heat.

2. The system for cooling paper within a printer assembly of claim 1, the system further adapted to cool the printed paper stock to at or below the optimal printhead operating temperature.

3. The system for cooling paper within a printer assembly of claim 2, the system further adapted to cool the printed paper stock to at or below 32° C.

4. The system for cooling paper within a printer assembly of claim 1, the system further adapted to cool the printed paper stock to at or below the optimal printhead operating temperature within four seconds.

5. A method for cooling paper within a printer assembly, the method comprising:

misting with at least one misting assembly an aqueous solution portion on a planar, unprinted surface of printed paper stock;

evaporating at an at least one convection accelerator assembly an aqueous solution misted onto the unprinted surface of the printed paper stock;

controlling at least one or more of misting and airflow, the airflow moving through an at least one convection accelerator assembly by creating air pressure differentials within the printer assembly;

determining with the at least one controller assembly the amount of heat to be dissipated into the airflow from the printed paper stock to obtain a selected sheet temperature of the printed paper stock; and determining further with the at least one controller assembly the amount and placement of aqueous solution the misting assembly mists onto the printed paper stock to dissipate the determined amount of heat.

6. The method for cooling paper within a printer assembly of claim 5, the method further including cooling the printed paper stock to at or below the optimal printhead operating temperature.

7. The method for cooling paper within a printer assembly of claim 6, the method further including cooling the printed paper stock to at or below 32° C.

8. The method for cooling paper within a printer assembly of claim 5, the method further including cooling the printed paper stock to at or below the optimal printhead operating temperature within four seconds.

9. A system for cooling paper within a printer assembly, the system comprising:

at least one misting assembly adapted to mist an aqueous solution portion on a planar, unprinted surface of printed paper stock;

at least one convection accelerator assembly adapted to accelerate evaporation of the aqueous solution mist on the unprinted surface of the printed paper stock, the misting assembly and the convection accelerator assembly disposed substantially on a lower portion of drying and cooling modules;

at least one controller assembly programmed to control at least one or more of misting and airflow, the airflow moved by air pressure differentials within the printer assembly;

the at least one controller assembly adapted to determine the amount of energy to be dissipated into the airflow; and the at least one controller assembly further determining the amount and placement of aqueous solution to be misted as a substantially conical mist by at least one micro-dispenser valve assembly onto the printed paper stock to dissipate the determined amount of heat.

10. The system for cooling paper within a printer assembly of claim 9, the system further adapted to cool the printed paper stock to at or below 32° C.

* * * * *